(12) United States Patent
Alt et al.

(10) Patent No.: US 6,348,696 B1
(45) Date of Patent: Feb. 19, 2002

(54) METHOD AND DEVICE FOR DETECTING THE POSITION OF THE EDGE OF A MOVING MATERIAL WEB

(75) Inventors: Gerhard Alt, Kleinaitingen; Gerhard Brunner; Harald Häussler, both of Augsburg; Hans Seibold, Anhausen, all of (DE)

(73) Assignee: Erhardt + Leimer GmbH, Augsburg (DE)

( * ) Notice: Subject to any disclaimer, the term of this patent is extended or adjusted under 35 U.S.C. 154(b) by 0 days.

(21) Appl. No.: 09/577,801

(22) Filed: May 24, 2000

(30) Foreign Application Priority Data

May 29, 1999 (DE) .......................................... 199 24 798

(51) Int. Cl.⁷ ................................................ G01V 8/00
(52) U.S. Cl. ............................. 250/559.36; 250/559.12
(58) Field of Search ...................... 250/559.12, 559.36, 250/559.42, 559.4, 221, 223 R, 559.24, 559.26; 356/383, 384, 385, 386; 378/54, 58

(56) References Cited

U.S. PATENT DOCUMENTS

| 3,625,048 A | 12/1971 | Roitel | 73/37.7 |
| 3,977,858 A | 8/1976 | Taguchi | 65/158 |
| 4,393,313 A | 7/1983 | Calkins et al. | 250/559.24 |
| 4,417,148 A | * 11/1983 | Otake | 250/561 |
| 5,764,367 A | * 6/1998 | Schaede et al. | 356/429 |
| 6,175,419 B1 | * 1/2001 | Haque et al. | 356/429 |

FOREIGN PATENT DOCUMENTS

| DE | 34 23 308 | 1/1986 |
| DE | 39 00 928 | 6/1990 |
| DE | 42 09 546 | 9/1993 |
| DE | 196 20 642 | 11/1997 |
| EP | 0 353 456 | 2/1990 |
| EP | 0 367 368 | 5/1990 |
| EP | 0 751 372 | 1/1997 |

* cited by examiner

Primary Examiner—David P. Porta
Assistant Examiner—Jurie Yun
(74) Attorney, Agent, or Firm—Collard & Roe, P.C.

(57) ABSTRACT

A method for detecting the position of the edge of a moving material web by contactlessly scanning the material web with a row of sensors. The sensors generate signals that are filed in a storage unit. A turning point is determined based on the function of the signals received from the sensor locations, and is issued as the edge position.

15 Claims, 4 Drawing Sheets

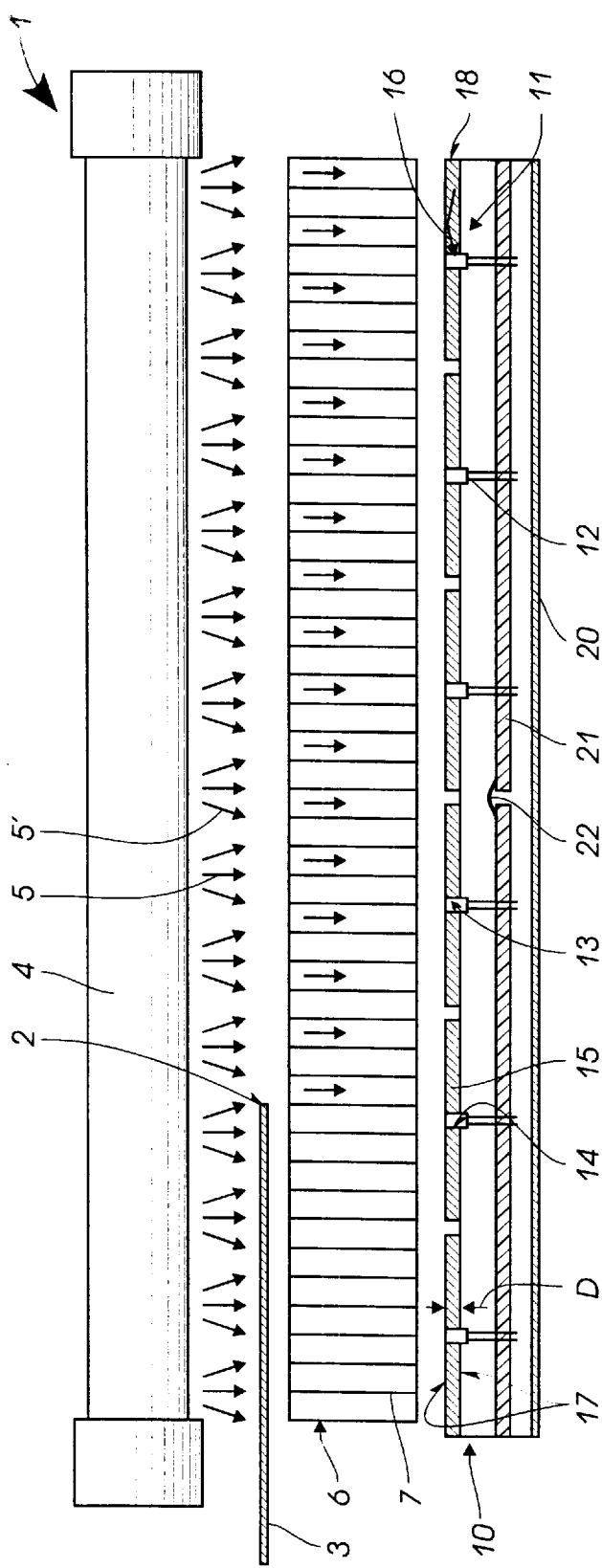
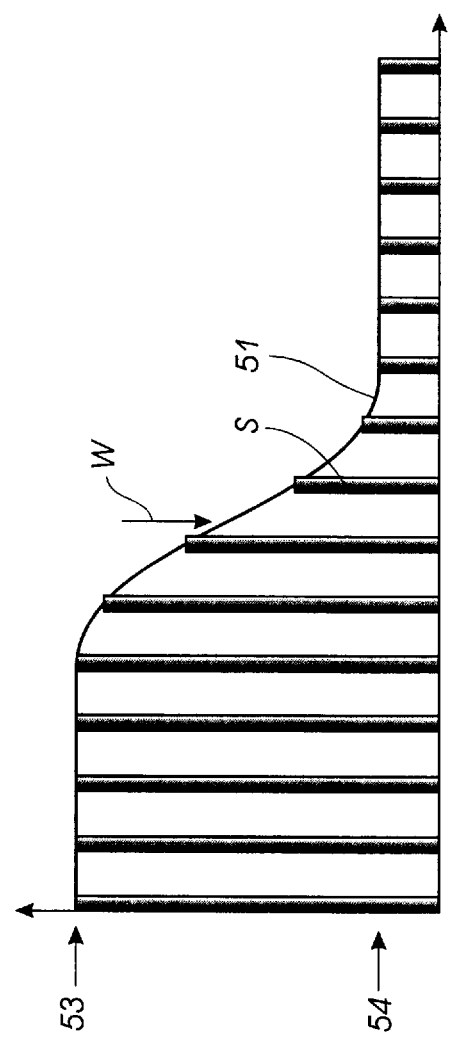

METHOD AND DEVICE FOR DETECTING THE POSITION OF THE EDGE OF A MOVING MATERIAL WEB

BACKGROUND OF THE INVENTION

1. Field of the Invention

The invention relates to a method for detecting the position of a moving material web, as well as to a device for carrying out the method.

2. The Prior Art

A photoelectric sensor system is described in German Patent No. DE 34 23 308 C2, in which a light source is disposed opposite a plurality of independently acting receiver components. The receiver components are formed by semiconductor photocells, which are optically coupled to the surfaces of plastic panels. Each of the receiver components detects a defined zone of the material web, and the photocell sends out a signal that is proportional to the coverage by the material web. The position of the edge of the material web is determined by comparing the signals emitted by the photocells with a threshold value. This method has the drawback that the resolution achievable with such a sensor system substantially corresponds with the width of the plastic panels. Therefore, to obtain a high resolution combined with a large measuring range, a very large number of photocells is required, which makes such a sensor system expensive. Furthermore, a very large number of photocells must be interrogated in each measuring cycle, which leads to intolerably long measuring times.

A device for detecting the position of the edge of a moving material web is described in German Patent No. DE 42 09 546 C2, which shows a receiver component disposed opposite each of a plurality of separately controllable light sources. The receiver components emit a signal that is proportional to the coverage by the material web, and which is compared with a threshold value. The result of this comparison is supplied to a microcomputer that controls the light sources and the receiver components depending on the result of the comparison according to a successive approximation, to determine the position of the edge of the material web. To carry out this successive approximation, it is necessary to store a number of comparative values of the receiver components with the threshold value in a memory unit of the microcomputer.

SUMMARY OF THE INVENTION

It is therefore an object of the invention to provide a method of the type specified above that achieves high resolution in a short measuring time period.

It is another object of the invention to provide a device for implementing this method at a favorable cost.

These and other objects of the invention are accomplished by a method for detecting the position of an edge of a moving material web, in which the material web is scanned by a plurality of sensors distributed transversely to the moving direction of the web. In this process, each sensor generates a signal that depends on the amount that the web covers the sensor. The signal generated by the sensor is preferably proportional to the coverage by the material web. In this way, each sensor supplies a signal that depends on the position of the edge of the material web, and the individual sensors are arranged in different zones in the measuring direction.

The material web is preferably scanned without the web coming into contact with the sensors, so that even webs consisting of a sensitive material will not be damaged by the sensors. Furthermore, the sensors themselves are prevented from interfering with the detection of the edge, as compared to a mechanical edge sensor that is pressed against the edge of the material web by spring force. With the edge of the material web being in about the mean position, the inner sensors viewed from the center of the web are completely covered by the material web, and emit a constant idle signal. The outer sensors are not covered by the material web at all, and generate a maximum signal. The sensors located in the zone around the edge of the material web supply signals that are between the idle signal and the maximum signal.

Therefore, the function of the signals generated by the sensors from the sensor locations have two constant ranges of different signal intensities when the edge is in about the mean position, with a constant transition range between the two ranges. If the edge of the material web is in an extreme position, i.e., near the innermost or outermost sensor, one of the constant ranges may also be missing, so that the determination of the edge via threshold values becomes very inaccurate. It is therefore proposed according to the invention that the position of the edge be determined based on the turning point of the function of the signals generated by the sensors from the sensor locations. This turning point can also be determined when the edge of the web is in an extreme position even if the sensor signals can no longer be determined with complete coverage or complete release of a sensor by the material web.

The individual sensors are preferably distributed equidistantly transversely to the direction of movement of the material web, so that the sensor location can be determined in a particularly simple way by numbering the sensors. In this way, the detection of the turning point can also be determined based on the function of the sensor signals by th e sensor number. The result of the search for the turning point is multiplied by the mutual spacing of the sensors. The turning point can also be generally determined based on a function of the sensor signals of values that are proportional to the sensor sites. In order to obtain a correctly scaled web edge position, the detected turning point has to be subsequently multiplied by the proportionality factor. In those cases in which only a signal proportional to the edge position is required, which is the case with web guiding devices, it is possible to eliminate a corresponding correction of the determined reversing point.

The sensor integrates its signal from a predetermined area, so that deposits with small-sized surface areas resting on the surface of the sensor have only a minor influence on the signal generated by the sensor. This is important in connection with material webs that lose a lot of fluffy matter in the form of lint, because the lint originating from the material web may directly deposit on the surface of the sensor. If the sensor had an effective width below about 1 mm, each individual lint fragment could cause complete coverage of a sensor, which would be erroneously interpreted as an edge of the material web.

Due to the design of the sensor with a large effective surface area, lint deposits may only lead to a uniform dampening of the signals of all sensors, which has no influence on the position of the turning point. Increased insensitivity to dirt of the edge-sensing system is therefore achieved. Since the turning point can be determined with substantially greater accuracy than the spacing of the individual sensors, this measure will not become a burden on the accuracy of the detection of the edge.

The methods for detecting the coverage of the material web work without contact with the web, and consequently do not interfere with the movement of the web. It is also possible to safely scan webs of particularly sensitive materials without the risk of damaging the material web, or the risk of any falsification of the measured values. The coverage by the material web is optically detected either by the reflection method or based on the light barrier principle.

The material web is illuminated by at least one light source, with light-sensitive receivers either on the side opposite the material web, or next to the light source. Alternatively, the coverage of the material web could be scanned pneumatically by air jets. This requires pressure-sensitive sensors. With acoustic scanning of the material web, sound waves are aimed at the material web, which are then detected with the help of microphones.

The function of the signals originating from the location of the sensor are differentiated two times numerically and a zero coefficient is determined based on the second derivative. The zero coefficient of the second derivative conforming to the edge position is located in the area of the greatest ascent, thus at a maximum value of the first derivative. Based on these conditions, it is possible to exactly determine the position of the edge wit h low computation expenditure.

Alternatively, it is possible to determine the turning point through simple numerical differentiation and numerical searching of the maximum of the first derivative. A second differentiation is thus saved. However, the search for the maximum of the first derivative requires greater numerical expenditure. However, this method offers the advantage that the condition of searching for the absolute maximum supplies the position of the edge of the web without any further secondary condition.

Alternatively it is proposed to approximate a fit function to the function of the signals generated by the sensors from the sensor locations, so that the turning point is directly calculated based on the fit parameters. The fit function is preferably approximated to the signals of the sensors by minimizing the squares of the deviations of the signals from the corresponding functional values of the fit function. The turning point generally can be computed analytically by two-times differentiation and putting the fit function to zero, so that depending on the fit function, it is possible to state a simple formula for calculating the turning point based on the fit parameters.

The fit function is preferably a polynomial whose coefficients are the fit parameters. Based on this polynomial, it is possible to analytically calculate the second derivative in a very simple way, so that the turning point can be directly determined based on the coefficients of the polynomial.

The signals of the individual sensors can be divided by the signal of a reference sensor. Measuring errors originating from a change in the illumination intensity of the emitter can be eliminated through this measure. If the signals of the sensor and the reference sensor are detected close to time, short-time variations of the emitter can be compensated as well. A sensor is preferably alternately interrogated by the reference sensor in order to compensate emitter variations in as optimal a way as possible.

The device according to the invention is successful for implementing the method as defined by the invention. The device has a plurality of sensors, which each generate a signal depending on the coverage by the web. The sensors are preferably set up next to each other in a row extending transversely to the direction of movement of the web. As an alternative, the sensors also can be arranged offset relative to one another in a zigzag configuration. The individual sensors must be located differently spaced from an edge of the web, imagining the web edge as a stationary edge. Each sensor thus reacts to changes occurring in the edge of the web within a defined range of the width. If t he sensor is completely covered by the web, it only generates an idle signal. If the sensor is not covered by the web at all, it generates a maximally active signal.

The individual sensors a reconnected to an A/D-converter via switching means. The signals of the individual sensors a re queried successively via the switching means and converted into a digital value. The switching means are actively connected to storage means, where the digitized values can be stored. A turning-point detector, which determines a turning point based on the function of the digitized values from the sensor locations, can access the storage means. The digital value computed by the turning-point detector is issued to a digital output and is thus available to further devices such as a web edge regulating means or display instruments.

So that the desired integrating effect of the individual sensors is achieved with the simplest of means, the sensor is designed in the form of a photosensor with an associated panel made of light-collecting plastic. The plastic panel contains a fluorescent substance that transforms the light coming from the light source into a light with long waves, which preferably propagates in the plane of the panel. The photodetector is coupled to the face side of the panel, so that it receives a very strong light signal and consequently a light signal that is insensitive to interference. Due to the appearance of total reflections of the light on the surfaces of the panels, the light is evenly distributed over the entire panel, so that the sensor supplies a signal that is exactly proportional to the coverage provided by the material web. It is not important whether the light penetrates the plastic panel with uniform distribution or only in a certain site.

The web edge detection is impaired by light rays directed inclined relative to the plane of the material web, especially if a large spacing exists between the light source and the sensors. There is preferably an element located between the light source and the sensors that parallelizes the light rays. This element is in the simplest case a body with a multitude of surfaces aligned perpendicular to the material web. For example, the element could be formed by tubular pieces, walls extending parallel with each other, or a honeycomb structure. As an alternative, the element could be formed by a row of lenses or a bundle of glass or synthetic fibers. It is important only that the light rays, viewed in the direction of detection of the device, are aligned parallel with one another. On the other hand, viewed in the direction of movement of the web, different directions of radiation of the light only play a subordinated role.

The switching means for interrogating the sensors in a time-shifted manner is preferably an analog multiplexer. An analog multiplexer is available in the form of an integrated circuit, which is consequently insensitive to chemicals and elevated temperatures that occur in the processing of textile material webs.

So that the signals generated by the sensors will not be falsified by the On-resistance of the analog multiplexer, which is not negligible, the signals are transmitted not as voltage but rather as current values. In order to permit subsequent analog-to-digital conversion, a current/voltage converter is arranged downstream of the analog multiplexer, and generates a voltage proportional to the sensor current.

If the device is employed in a very hot environment, it must be capable of handling thermal expansion. Since the individual components of the device are made of different materials, the sensitive motherboards—on which the sensor electronics is mounted—must be designed so that they are somewhat expandable. The motherboards supporting the sensors are therefore designed at least partially flexible. It is conceivable to build up all of the sensors on at least one motherboard that is flexible over its entire length. As an alternative, the sensors can be accommodated in the form of modules set up on hard motherboards, with a flexible connection via cables between each of the individual modules.

The circuitry of the turning point detector is costly, so that the detector is preferably designed in the form of a controller. The required computing steps can be accomplished by a suitably devised operating program, so that the circuitry expenditure is kept within justifiable limits. The required A/D-converter is preferably designed as a component of the controller as well, which further reduces the circuitry expenditure.

Finally, there is at least one D/A-converter which can be designed as a component of the controller as well downstream of the turning point detector. The digital-to-analog converter generates an analog signal that is proportional to the turning point and thus to the position of the edge. The analog signal can be directly supplied to a web edge regulator.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a section through the device for detecting the edge of a material web;

FIG. 3 is a graphical representation of the sensor signals as a function of the sensor locations;

DETAILED DESCRIPTION OF THE PREFERRED EMBODIMENT

Figure 2:
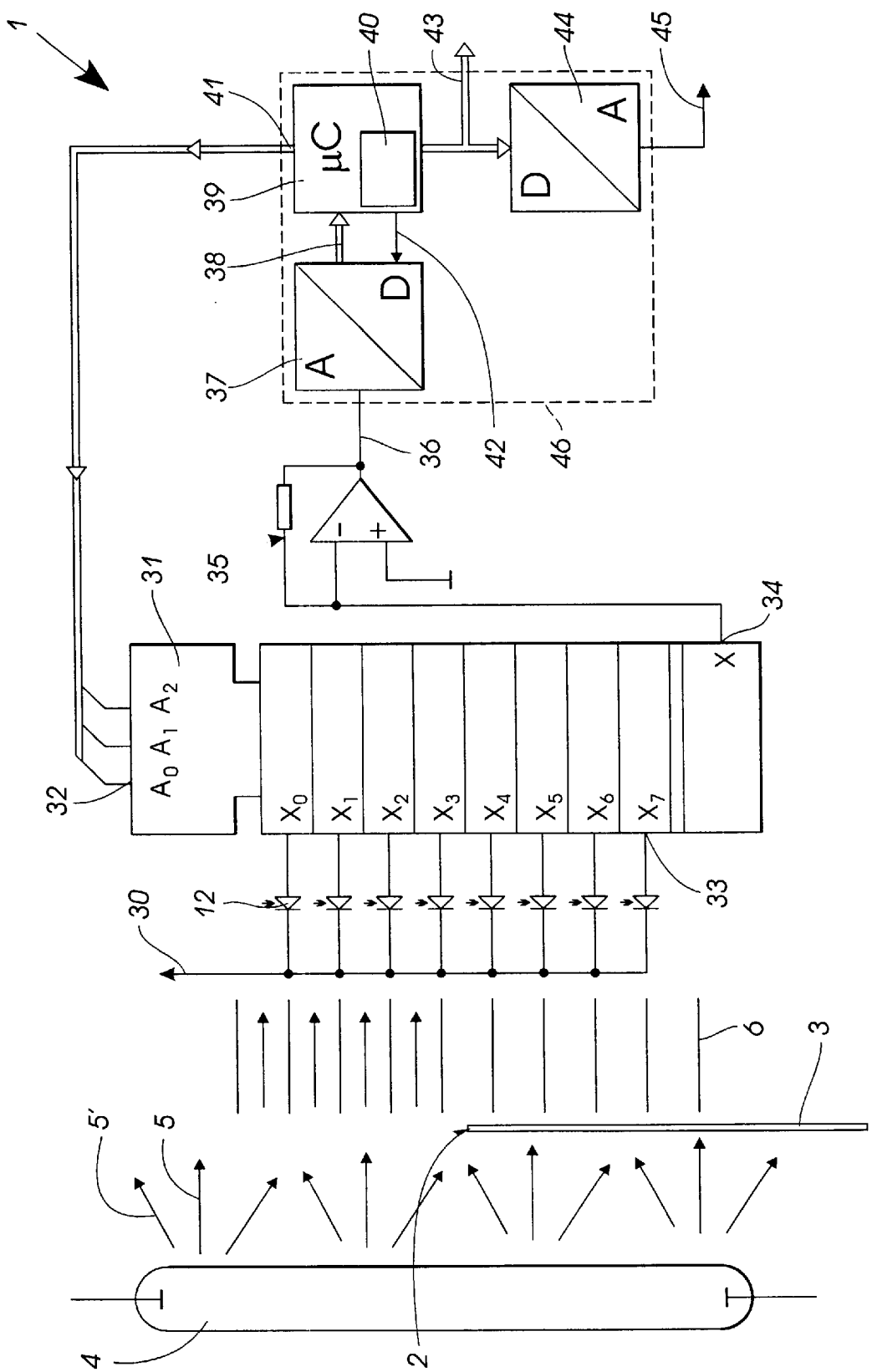
FIG. 2 shows a basic circuit diagram of the device according to FIG. 1.

Referring now in detail to the drawings, FIG. 1 shows a sectional representation of a device 1 for detecting the position of an edge 2 of a material web 3. The device 1 has a light source 4 in the form of a fluorescent tube, which emits the light rays 5, 5' against the material web 3. A smaller or larger part of the light rays 5, 5' is absorbed or reflected by the material web depending on the position of the edge 2 of the material web 3. The other part of the light rays 5, 5' is not influenced by the material web 3 in any way.

The light rays 5, 5' subsequently pass through an optical element 6, which is formed by a plurality of walls 7 aligned perpendicular to material web 3. The light rays 5', which extend at an angle relative to the walls 5, are absorbed by the walls 7, so that only those light rays 5 that extend approximately perpendicular to the material web 3 can pass through the optical element 6. A sharp reproduction of the edge is thus achieved by the light rays 5.

After passing through optical element 6, light rays 5 impinge upon a sensor unit 10, which is formed by a plurality of sensors 11. Each sensor 11 consists of a light-sensitive element in the form of a photodiode 12 located in a bore 14 of a plastic panel 15. The thickness "D" of the plastic panel 15 is adapted to the height of the light-sensitive surface 13 of the photodiode 12.

A fluorescing dye is installed in the plastic panel 15. This dye converts the incident light rays 5 into the light rays 16 with long waves. These long-wave light rays preferably approximately propagate in the plane of the plastic panel 15 and are therefore totally reflected on the upper and lower limit surfaces 17 of the plastic panel 15. The long-wave light rays 16 therefore exit from the plastic panel 15 primarily on the faces 18 as well as on the wall of the bore 14. This assures that a relatively large component of the light 5 entering the plastic panel 15 reaches the light-sensitive surface 13 of the photodiode 12, so that it gives off a photo-current that is correspondingly high. This reduces the sensitivity of the device 1 to interference, so that the individual sensors have an advantageous integrating effect across the surface of the panel of preferably about 15 cm². The sensors are therefore insensitive to punctiform soiling.

The plastic panels 15 are supported on a common carrier 11, which is preferably sealed against the material web 3. This is particularly important in cases in which the device 1 is employed in the wet zone, where the material web 3 is partially treated with caustic chemicals. The tight insulation of the carrier 20 versus the material web 3 assures that the sensor unit 10 is adequately protected against the chemicals.

The photodiodes 12 are soldered to the motherboards 21 which, as opposed to the carrier 20, are composed of a plurality of single components. This has the advantage that the printed circuit motherboards 21 can be manufactured in a simpler way, especially for very long sensors. On the other hand, the printed circuit motherboards 21 are capable of expanding versus the carrier 21 without causing damage to the sensitive layer of conducting paths on the PC motherboards 21. This is especially important in those cases in which device 1 is subject to elevated temperatures of up to 105° C. The connection between the individual PC motherboards 21 is established by a flexible segment 22 in the form of a multi-core cable. As an alternative, the entire PC motherboard 21 could be produced from a flexible material such as a copper-coated foil.

FIG. 2 shows a schematic circuit diagram of device 1. The light emitted by the light source 4 passes through the material web 3 as well as through the optical element 6 and is detected by the photodiodes 12. On the cathode side, the photodiodes 12 are connected to a reference voltage source 30 in order to apply an adequate gate voltage to the photodiodes 12. As an alternative, the photodiodes 12 could be wired also as photocells, in which case resistors are then connected in parallel with the photocells in order to suppress capacitive current peaks.

On the anode side, the photodiodes 12 are connected to an analog multiplexer 31 which, in accordance with the logic levels, connects at its address inputs 32 a selected input 33 to the output 34. The output 34 of analog multiplexer 31 is connected to a current/voltage converter 35, which pulls output 34 of analog multiplexer 31 to mass. In this way, photodiode 12 selected based on the level on the address inputs 32 is capable of conducting its photo-current via analog multiplexer 31 into the current/voltage converter 35, which converts the photo-current into a voltage that is proportional to the photo-current. It is assured by this structure that the on-resistance of the analog multiplexer 31, which is not negligible, has no influence a tall on the photo-signal generated by photodiode 12.

An output 36 of current/voltage converter 35 is connected to an A/D converter 37, which generates a digital value corresponding with the photo-current. These digital values are received via a signal path 42 in a microcontroller 39, which first files the individual digital values in a storage unit 40.

A operating program is filed in the microcontroller 39. This program generates addresses for the analog multiplexer 31 and applies the addresses to an address output 41. In addition, the operating program controls the A/D-converter 37 via the signal path 42, and receives the digitized values via the signal path 38. The operating program of the microcontroller, furthermore, effects the filing of the digitized values in the storage unit 40 and the computation of a turning point based on the stored data.

Finally, the operating program outputs the determined turning point to an output 43 and controls the digital-to-analog converter 44, which converts the digital value on output 43 into an analog voltage and issues the latter to an analog output 45. The value applied to digital output 43 and analog output 45 corresponds with the position of edge 2 of material web 3 and can be used by other devices such as edge regulators or display units.

FIG. 3 shows a schematic representation of the signals "S" detected by sensors 11 as a function of the respective sensor location. Each of the signals "S" of the individual sensors is represented in the form of a bar. The signals "S" jointly result in a function 51 of the respective sensor location, which is represented in the form of a curve. When a turning point "W" is determined based on said function 51, such turning point supplies the position of edge 2 of the material web 3 with adequate accuracy, so that the turning point "W" is independent of the maximal signal 53 and the idle signal 54.

Figure 4:
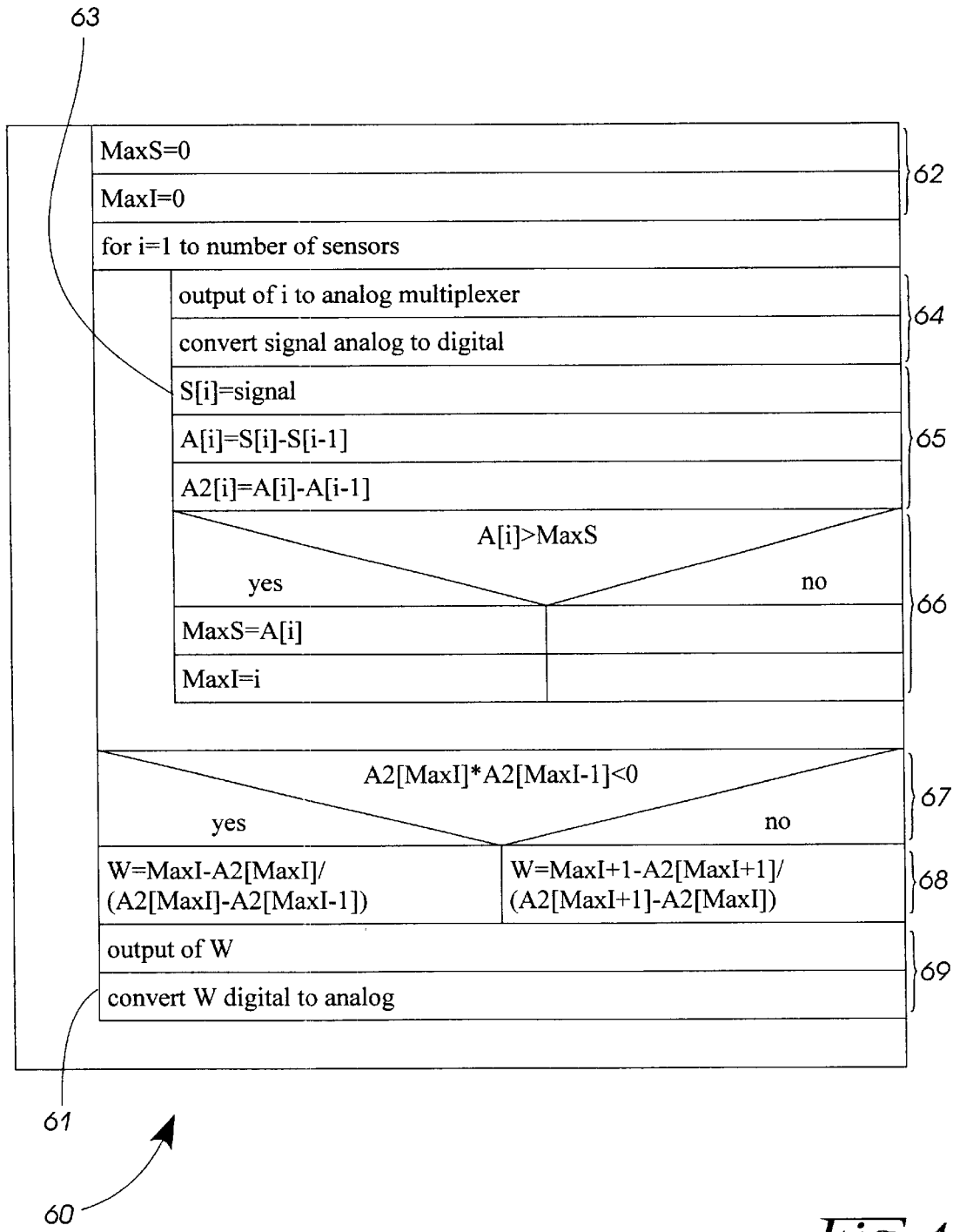
FIG. 4 shows an algorithm for determining the edge.

FIG. 4 shows a first variation of an algorithm 60 for the operating program of microcontroller 39. As device 1 is expected to periodically determine edge 2 of the material web 3, the operating program is designed in the form of an endless loop 61. An initialization 62 of the variables MaxS and MaxI takes place at the start of the endless loop 61.

The initialization stage 62 is followed by a counting loop 63, which is passed once for each individual sensor 11. A measurement 64 is carried out first in the counting loop 63, in that the counting variable 1 is issued to the analog multiplexer 31 as an address and the voltage value "S" applied to the A/D-converter 37 is converted.

The measured voltage value "S" is subsequently stored in the storage unit 65, whereby the first derivative A and the second derivative A2 of the voltage values "S" are computed by calculating the differences of neighboring values. It is assumed that the individual sensors 11 are spaced equally in relation to each other. This means that the spacing of the sensors 11 from each other is only a constant factor for forming the first derivative A and the second derivative A2, so that the spacing can remain neglected.

After the storing 65 of the voltage values "S", a maximum search 66 of the first derivative A takes place. For this purpose, the determined value of the first derivative A [i] is compared with the variable MaxS and, if the value is greater than MaxS, is noted as the new maximum of the first derivative A. This means that the variable MaxI receives at the end of the counting loop 63 the number of that sensor 11 where the first derivative A [MaxI] is maximal.

After all loop passages of the counting loop 63 have been completely passed, an interrogation 67 takes place, in which it is determined where the second derivative A2 has a change of the sign. A turning point "W" is subsequently computed in step 68 based on the second derivatives A2 on both sides of the sign change, by linear interpolation between the two values. Finally, the computed turning point "W" is issued in the final output step 69 in the digital form and converted into an analog value.

As an alternative, the turning point "W" could be computed by interpolation of a nonlinear function, for example a polynomial of a higher degree, which enhances the accuracy of the turning point computation 68 accordingly. Furthermore, instead of an interpolation, it is possible to carry out an approximation of a fit function using t he method of minimization of the square spacings of the fit function of the stored values "S", "A" or "A2". In this way, errors of the signals "S" have a correspondingly lower influence on the determination of the turning point "W".

Figure 5:
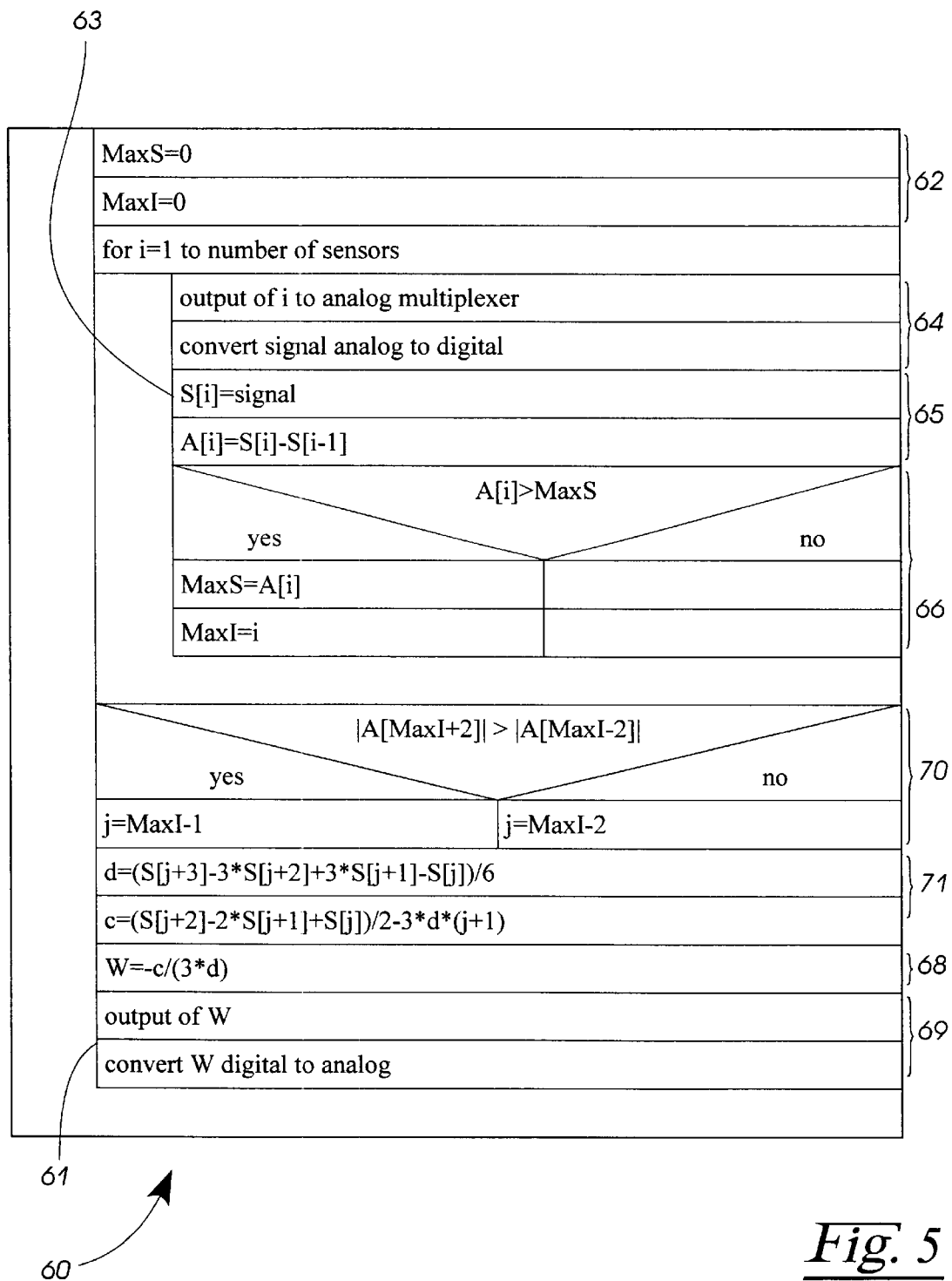
FIG. 5 shows an alternative algorithm for determining the edge.

FIG. 5 shows an alternative algorithm 60, which corresponds in the steps 62 to 66 with the proviso that the second derivative A2 is not computed. Following passage through all loop passages 63, an interrogation 70 takes place in which that side of the found maximum of the derivative A is determined on which the derivative A is the greatest. Thereafter, a polynomial of the third degree is determined through interpolation 71 on four successive values "S" of the stored signal. This polynomial has the following general form:

$$S = a + bx + cx^2 + dx^3.$$

As the constant "a" and the linear coefficient "b" are not required for computing the turning point "W", the computation of coefficients "a", "b" can be omitted in the interpolation 71, and only the coefficients "e", "d" are computed. The turning point "W" of the interpolation polynomial is computed based on the coefficients "c" and "d" in a step 68. The output step 69 is again identical with the algorithm 60 according to FIG. 4.

Accordingly, while only a few embodiments of the present invention have been shown and described, it is obvious that many changes and modifications may be made thereunto without departing from the spirit and scope of the invention.

What is claimed is:

1. A method for detecting the position of an edge of a moving material web, comprising:

scanning the material web with a plurality of sensors located transverse to the moving direction of the material web;

generating a signal based on coverage of each sensor by the material web, the signal having a value proportional to the sensor location;

converting the signal to a digital and/or analog output signal; and determining a turning point based on a function of sensor signals, wherein the issued output signal is proportional to the determined turning point.

2. The method according to claim 1, wherein the sensor integrates over a predetermined area transversely to the moving direction of the web.

3. The method according to claim 1, wherein the coverage by the material web is detected by a method selected from the group consisting of optically, pneumatically and acoustically.

4. The method according to claim 1, wherein the turning point is determined by two-times numerical differentiating of the function of the sensor signals having values proportional to the sensor locations, said function being generated by the sensors, wherein a zero coefficient of a second derivative so determined is computed by interpolation or approximation.

5. The method according to claim 1, wherein the turning point is determined by numerical differentiating of the function of the signals, said function being generated by the sensors, wherein the maximum of a derivative so determined is computed by one of interpolation and approximation.

6. The method according to claim 1, wherein the turning point is determined by interpolation or approximation of a fit function to the function of the signals, said function being generated by the sensors, wherein the turning point is computed based on determined fit parameters.

7. The method according to claim 6, wherein the fit function is a polynomial.

8. The method according to claim 1, wherein signal of one of the sensors is scaled with a signal of a reference sensor, and both signals are detected close to time.

9. A device for detecting the position of an edge of a moving material web, comprising:
  a plurality of sensors located distributed transversely to the direction of movement of the web, said sensors each generating a signal depending on their coverage by the material web,
  a switching means actively connecting the sensors to an analog-to-digital (A/D) converter;
  storage means associated with said A/D converter for storing digitized values; and
  a turning point detector actively connected to said storage means for determining a turning point based on a function of the digitized values proportional to the sensor locations.

10. The device according to claim 9, wherein the sensor has a panel comprising light-collecting plastic, and further comprising a photodetector associated with said panel, and at least one light source located opposite the sensors.

11. The device according to claim 10, further comprising an element parallelizing the light rays from the light source, said element being located between the light source and the sensors.

12. The device according to claim 9, wherein the switching means are formed by at least one analog multiplexer, with at least one current/voltage converter being arranged downstream of said multiplexer.

13. The device according to claim 9, wherein the sensors are mounted on PC motherboards that are at least partly flexible.

14. The device according to claim 9, wherein the turning point detector and the A/D converter are realized in the form of at least one microcontroller.

15. The device according to claim 9, further comprising at least one D/A converter arranged downstream of the turning point detector.

* * * * *